United States Patent Office 2,992,483
Patented July 18, 1961

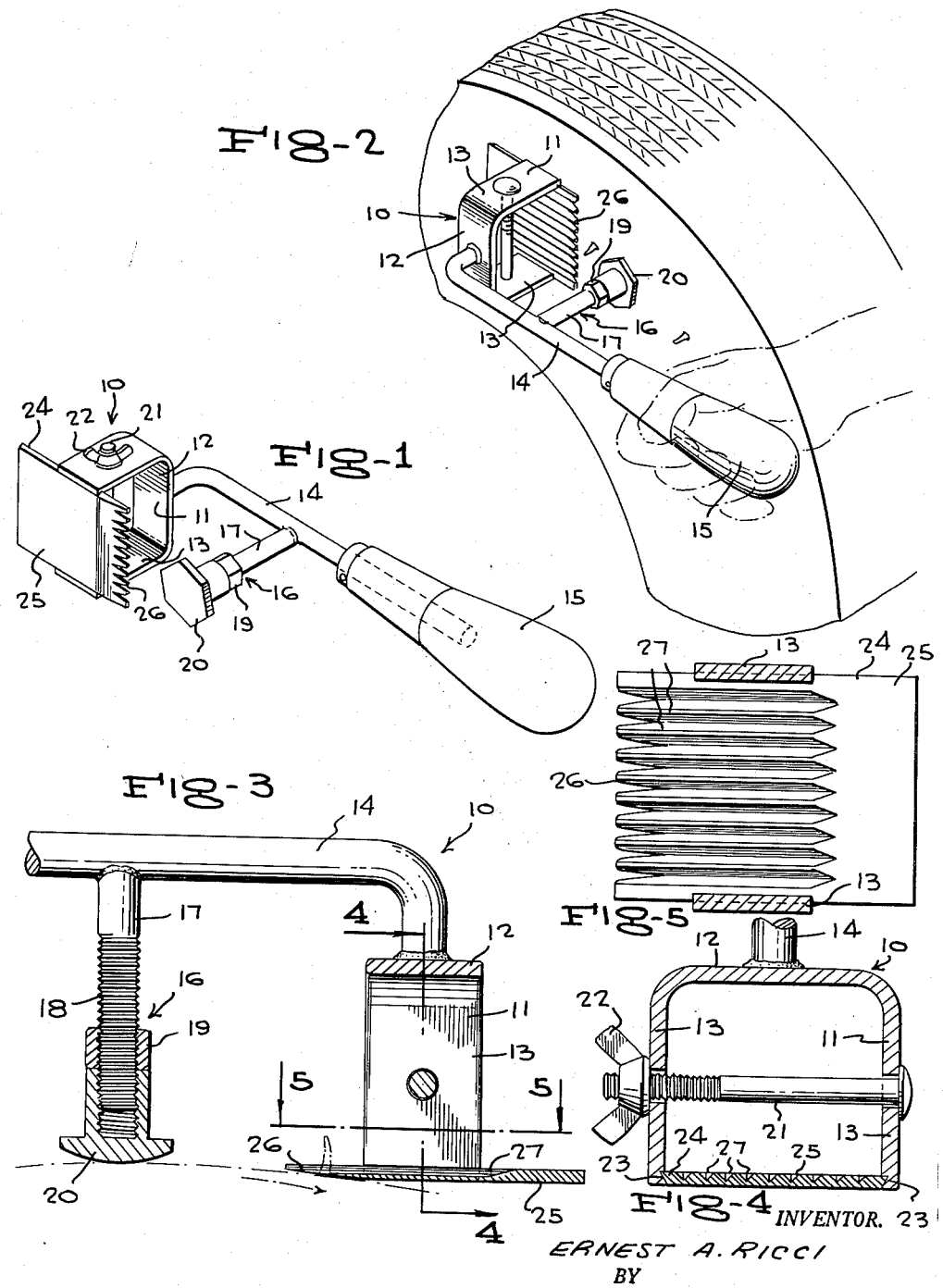

2,992,483
TIRE TRIMMING DEVICE
Ernest A. Ricci, 1477 Sunset Drive, Pottstown, Pa.
Filed May 13, 1960, Ser. No. 29,027
1 Claim. (Cl. 30—280)

This invention relates to a knife for trimming purposes and particularly to an improved tire trimming knife and it consists in the constructions, arrangements and combinations herein described and claimed.

As is well understood in the art of curing automobile tires, the molds employed have vent openings formed therein to permit air and moisture to escape and thus prevent formation of blemishes or other defects on the tread and side walls of the tire. The vent holes are usually formed in rows around the circumference of the mold and produce rubber protuberances upon the molded tire, which must then be removed.

It is therefore the cardinal object of the invention to provide a knife which is manually manipulated in the removal of such protuberances in a quick and easy manner.

More specially, it is an object of the invention to provide a trimming knife wherein a handle member is employed in the manipulation of the knife which includes a rest or fulcrum member for ready control of the cutting blade of the knife.

It is also an important object of the invention to provide a novel, yet simple construction of holder for the cutting blade enabling ready securement and removal of the cutting blade for sharpening purposes, as will be required.

Additional objects, advantages and features of invention will be apparent from the following description, considered in conjunction with the accompanying drawing, wherein, FIGURE 1 is a perspective view of the knife, FIGURE 2 is a similar view showing the knife as used in trimming the side wall of a tire, FIGURE 3 is an enlarged vertical fragmentary section through the knife, illustrating its use upon a tire, the latter and the direction of rotation of the tire being indicated in dot and dash lines, FIGURE 4 is a vertical section taken on the line 4—4 of FIGURE 3, and FIGURE 5 is a cross section taken on the line 5—5 of FIGURE 3.

There is illustrated a tire trimming knife generally indicated by the reference character 10, which as shown comprises a U-shaped body member 11 providing a transverse wall 12 and a pair of parallel spaced leg members 13 extending at right angles to the wall 12.

Intermediate the length of the wall 12 and medially thereof, one end of a shank 14 of a handle 15 is secured in any suitable manner. The shank 14 may be of any desired length and includes an adjustable fulcrum or rest member 16, which it will be noted is positioned in advance of the cutting edge of the blade as will be presently described.

The fulcrum or rest member 16 comprises a vertically positioned cylindrical extension 17, one end of which is secured to the shank 14 of the handle, extending at right angles thereto as well as to the U-shaped body. The extension 17 is threaded as at 18 and receives a lock nut 19 for securing a tire contacting shoe 20 in adjusted vertical position upon the extension.

The leg members 13 of the body member are provided with aligned openings intermediate of the length thereof for reception of a threaded bolt 21, of a length to project beyond a leg member for reception of a wing nut 22, for a purpose as will appear.

The lower or free ends of the legs are formed upon the inner faces thereof with a slot 23, the slot being tapered from the terminal ends of the legs inwardly upon the body of the legs at an angle of 60 degrees to accommodate respective tapered sides 24 of the cutting blade 25.

It will be seen that by tightening the wing nut 22, the legs 13 will be drawn into firm gripping action upon the side edges of the blade for securement thereof and that upon loosening the wing nut 22, the blade 25 may be removed for sharpening of the cutting edge 26 which it will be noted is defined by a series of parallel spaced grooves or flutes 27 formed upon the upper face of the blade, the bottom face being planiform and lying flush with the terminal ends of the legs 13. Also, by this construction, the cutting edge 26 may be adjusted with respect to the fulcrum or rest 16 to meet requirements of an operator or the character of the work being trimmed. By forming the blade with grooves or flutes, it will be seen that the cutting edge is in the form of a series of teeth of triangular formation which, when encountering protuberances on a tire will provide a direct shearing action upon opposed sides thereof.

The fulcrum or rest 16 may be adjusted vertically by loosening the lock nut 19 and then adjusting the shoe 20 to a desired height on the threaded extension 17, when the lock nut is tightened to maintain the adjustment. The shoe 20 has a convex contact face 28 permitting smooth movement upon the surface of a tire being trimmed.

In use, the tire to be trimmed is rotatably supported by any suitable means not shown, the fulcrum or rest member 16 having been adjusted to the requirements of the work or the operator and with the tire under rotation, the operator places the blade and shoe upon the tire, the cutting edge 26 being presented in the direction of rotation of the tire. The knife may now be readily moved across the sides or other portion of the tire so that the fluted cutting edges 26 engages the rubber protuberances to sever the same from the tire. The convex face of the fulcrum or rest member permitting smooth manipulation of the knife without liability of gouging the tire surface.

While I have shown and described a preferred form of the invention, this is by way of illustration only, and I consider as my own all such modifications in construction as fairly fall within the scope of the appended claim.

I claim:

A tire trimming knife comprising a U-shaped frame defining a pair of vertical opposed leg members, each leg member having a slot formed inwardly of the free ends thereof and being in opposed relation, a cutting blade seated between said slots, the bottom face of the cutting blade being flush with the terminal ends of said leg members, means extended through said leg members for drawing said legs into gripping action with the cutting blade, a shank secured to said U-shaped frame including a handle, a vertically disposed fulcrum-rest member carried by the shank positioned forwardly of the cutting edge of said cutting blade, said fulcrum-rest member comprising a threaded extension, a tire contact shoe threadedly engaged upon the lower portion of said extension to adjustably vary the angle of the cutting edge of said cutting blade.

References Cited in the file of this patent

UNITED STATES PATENTS

| 240,076 | Bauer | Apr. 12, 1881 |
| 755,248 | Sanborn | Mar. 22, 1904 |
| 1,239,316 | Svendsen | Sept. 4, 1917 |
| 1,934,181 | Fouke | Nov. 7, 1933 |
| 2,222,036 | Koppin et al. | Nov. 19, 1940 |
| 2,492,681 | Carroll | Dec. 27, 1949 |
| 2,768,437 | Ronjan et al. | Oct. 30, 1956 |
| 2,807,877 | Fryer et al. | Oct. 1, 1957 |